United States Patent
Ouattara et al.

(10) Patent No.: US 10,389,277 B2
(45) Date of Patent: Aug. 20, 2019

(54) DEVICE FOR CONTROLLING A PIEZOELECTRIC ACTUATOR

(71) Applicants: UNIVERSITE D'AIX-MARSEILLE, Marseilles (FR); CENTRE NATIONAL DE LA RECHERCHE SCIENTIFIQUE, Paris (FR)

(72) Inventors: Issa Ouattara, Marseilles (FR); Jean-Luc Gach, Peynier (FR); Philippe Amram, Aix-en-Provence (FR)

(73) Assignees: UNIVERSITE D'AIX-MARSEILLE, Marseilles (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 15/735,443

(22) PCT Filed: Jun. 10, 2016

(86) PCT No.: PCT/EP2016/063355
§ 371 (c)(1),
(2) Date: Dec. 11, 2017

(87) PCT Pub. No.: WO2016/198639
PCT Pub. Date: Dec. 15, 2016

(65) Prior Publication Data
US 2018/0183357 A1 Jun. 28, 2018

(30) Foreign Application Priority Data
Jun. 12, 2015 (FR) .................................. 15 55381

(51) Int. Cl.
*H01L 41/09* (2006.01)
*H02N 2/06* (2006.01)
*G01J 3/26* (2006.01)

(52) U.S. Cl.
CPC ................ *H02N 2/062* (2013.01); *G01J 3/26* (2013.01)

(58) Field of Classification Search
CPC .................................... H02N 2/062; G01J 3/26
(Continued)

(56) References Cited

U.S. PATENT DOCUMENTS

| 4,263,527 A | 4/1981 | Comstock |
| 6,504,669 B1 * | 1/2003 | Janz ..................... G11B 5/5552 |
| | | 360/78.05 |

(Continued)

FOREIGN PATENT DOCUMENTS

| EP | 0 375 570 A2 | 6/1990 |
| WO | 2004/073076 A1 | 8/2004 |
| WO | 2008/141908 A2 | 11/2008 |

OTHER PUBLICATIONS

J. Agnus, "Etude, Réalisation, Caractérisation et Commande d'une Micropince Piézoélectrique" ("Study, Production, Characterization and Control of a Piezoelectric Microgripper"), University of Franche-Comté, 2003.

*Primary Examiner* — Thomas M Dougherty
(74) *Attorney, Agent, or Firm* — Baker & Hostetler LLP

(57) ABSTRACT

A device is provided for controlling a piezoelectric actuator able to combine two types of piezoelectric actuator control, namely voltage control and charge control. Switching between charge control and voltage control takes place automatically, without added switching elements, according to the nature of the voltage applied to the input of the setup.

8 Claims, 3 Drawing Sheets

(58) Field of Classification Search
USPC .............. 310/316.01–316.03, 317, 318
See application file for complete search history.

(56) References Cited

U.S. PATENT DOCUMENTS

| | | |
|---|---|---|
| 7,015,621 B2 | 3/2006 | Mizuuchi |
| 2003/0094882 A1 | 5/2003 | Mizuuchi |
| 2006/0055284 A1* | 3/2006 | Hoshino ............... H02N 2/065 310/317 |

* cited by examiner

DEVICE FOR CONTROLLING A PIEZOELECTRIC ACTUATOR

CROSS-REFERENCE TO RELATED APPLICATIONS

This application is a National Stage of International patent application PCT/EP2016/063355, filed on Jun. 10, 2016, which claims priority to foreign French patent application No. FR 1555381, filed on Jun. 12, 2015, the disclosures of which are incorporated by reference in their entirety.

FIELD OF THE INVENTION

The invention relates to the field of controlling piezoelectric actuators, and in particular to a control circuit that allows the hysteresis of such actuators to be decreased.

PRIOR ART

There exist two main types of piezoelectric actuators: direct actuators in which the displacement obtained, which is of the order of a micrometer, is equal to the deformation of the piezoelectric material, and amplified actuators in which a mechanical circuit amplifies the motion and thus increases the degree of displacement, which is of the order of a millimeter. In these devices, an electric field is used to obtain a deformation of the piezoelectric material and to control the displacement. An actuator may be voltage-controlled or charge-controlled.

U.S. Pat. No. 4,263,527 by Comstock describes a device for charge-controlling a piezoelectric actuator.

U.S. Pat. No. 7,015,621 B2 by Mizuuchi describes a device for voltage-controlling a piezoelectric actuator.

Although it is the commonest solution and the simplest to implement, voltage control has a major drawback in that the displacement of the actuator, which is dependent on the applied voltage, is not linear. This is due in particular to variations in the physical parameters of the piezoelectric material, namely creep and hysteresis.

Creep is a slow deformational drift in the material over time, which manifests as a slow elongation of the actuator under a constant voltage and results in the position shifting a few percent per decade from the initial setpoint displacement.

Hysteresis is the property of a system to tend to remain in a certain state even though the action of the external instigator of the change in state has ceased. Piezoelectric actuators exhibit hysteresis between the voltage applied and the displacement caused. This non-linearity may vary between 10 and 20% depending on the nature of the material, and the displacements of a piezoelectric actuator differ depending on whether it is a rising voltage or a falling voltage that is applied thereto.

There exist solutions for improving the behavior of piezoelectric actuators, in particular for decreasing hysteresis.

Patent application FR2850219 by J. Agnus et al. describes a device combining voltage and charge control of a piezoelectric actuator that makes it possible to obtain an open-loop linear static behavior, thus decreasing hysteresis. However, the circuit requires the addition of switching means in order to toggle from one control mode to the other.

There is a need then for a solution that overcomes the drawbacks of the known approaches. The present invention addresses this need.

SUMMARY OF THE INVENTION

One object of the present invention is to provide a system that is able to combine two types of piezoelectric actuator control, namely voltage control and charge control, in which switching between charge control and voltage control takes place automatically, according to the nature of the voltage applied to the input of the setup.

Advantageously, the device of the present invention is simple to implement and inexpensive, requiring no other, external circuit for driving the piezoelectric actuators.

Advantageously, the gain of the device is the same at high and low frequency by virtue of the matching of the capacitive or resistive bridge. The gain of the amplifier is set by the resistors at low frequency or even continuously, while, at high frequency, the gain is set by the capacitance of the capacitors formed by the piezoelectric actuator and the capacitor that is referred to as the reference capacitor $C_{ref}$. Thus, starting from intrinsic capacitance $C_{pzt}$ of the piezoelectric actuators, provided by the manufacturers, and from the desired gain, it is a simple matter to size the discrete components of the resistive ($R_{pzt}$, $R_{Cref}$) and capacitive ($C_{pzt}$, $C_{ref}$) bridges, since the gain $A_v$ is given by the relationship $C_{ref}/C_{pzt}=R_{pzt}/R_{Cref}$.

Another advantage of the invention is that the hybrid amplifier is able to operate with any type of piezoelectric actuator for which it is not necessary to have knowledge of the equivalent hysteresis model. The hybrid amplifier thus makes it possible to control any piezoelectric actuator in an open loop since the voltage-displacement property is rendered practically linear.

Advantageously, the output voltage of the hybrid amplifier is taken at the terminals of the piezoelectric actuator and not at the terminals of the set ($C_{pzt}$, $R_{pzt}$, $C_{ref}$, $R_{Cref}$), in which case the hysteresis is not reduced.

In one preferred embodiment, the device for controlling a piezoelectric actuator of the invention comprises:

an operational amplifier having an inverting input and a non-inverting input, and an output allowing an output voltage to be delivered;

a capacitive circuit comprising a piezoelectric actuator and a capacitor in series, said capacitive circuit being connected by the free end of the piezoelectric actuator to the output of the operational amplifier and by the free end of the capacitor to a low-voltage terminal;

a resistive circuit comprising a first resistor and a second resistor in series, said resistive circuit being connected by the free end of the first resistor to the output of the operational amplifier and by the second resistor to a low-voltage terminal;

the device being characterized in that the inverting input of the operational amplifier is connected to the common ends of the piezoelectric actuator and of the capacitor, and is connected to the common ends of the first and the second resistor, the capacitive circuit and the resistive circuit forming an impedance bridge.

Advantageously, the ratio of the impedances of the capacitive circuit is equal to the ratio of the impedances of the resistive circuit.

In one operating mode, a control signal at a given frequency applied to the non-inverting input of the operational amplifier allows the piezoelectric actuator to be charge-controlled.

In another operating mode, a continuous control signal applied to the non-inverting input of the operational amplifier allows the piezoelectric actuator to be voltage-controlled.

In one embodiment, the operational amplifier is supplied with between −60 V and +160 V.

In one variant implementation, the device of the invention comprises unidirectional transil diodes that are connected to the terminals of the piezoelectric actuator in order to limit the voltage at said terminals. The voltage at the terminals of the piezoelectric actuator may be limited to +150 V and −20 V, respectively.

In another variant, the device of the invention additionally comprises a resistor that is connected to the output of the operational amplifier in order to limit the current drawn by the piezoelectric actuator.

The invention also covers an interferometer controlled by a control device such as described. Advantageously, the interferometer may be a Fabry-Pérot interferometer.

Piezoelectric actuators are used in various fields for various purposes, such as the active control of vibrations for aiding in the machining of industrial parts, the control in microscopes of small displacements for scanning a surface to be probed, the control of automotive vehicle injectors, the production of fine droplets in printers, the adjustment of the length of a laser cavity in optoacoustics or else the micropositioning of a mirror in astronomy.

DESCRIPTION OF THE FIGURES

Various aspects and advantages of the invention will appear in support of the description of one preferred, but non-limiting, mode of implementation of the invention, with reference to the figures below.

DETAILED DESCRIPTION OF THE INVENTION

Figure 1:
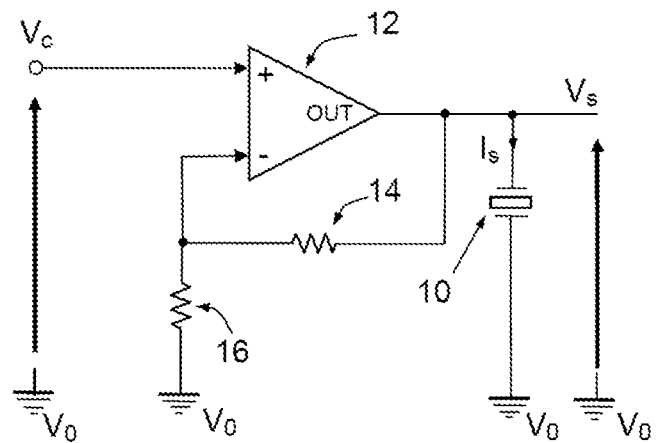
FIG. 1 illustrates a voltage control device of the prior art.

FIG. 1 illustrates a voltage control device known from the prior art. The principle of voltage control is to apply a voltage $V_s$ to the terminals of a piezoelectric actuator (10) by means of an amplifier (12). The circuit comprises a piezoelectric actuator (10) that is connected to the output of an operational amplifier (12). The amplifier (12) is connected in a non-inverting setup, and receives, on a first input, a control voltage $V_c$. A first resistor $R_1$ (14) is connected between the ouput of the amplifier (12) and a second input of the amplifier. A second resistor $R_2$ (16) is connected between the second input of the amplifier and a low voltage $V_0$.

The output voltage $V_s$ of the amplifier (12) is proportional to its control voltage $V_c$ according to the relationship:

$$Vs = 1 + \frac{R_1}{R_2} V_c \quad (1)$$

The voltage gain $A_v$ of the amplifier (12) is constant and is defined by the resistances R1 and R2 (14, 16) according to the equation:

$$Av = \frac{V_s}{V_c} = 1 + \frac{R_1}{R_2} \quad (2)$$

The frequency response of the circuit is given by the following equation:

$$f = \frac{I_s}{2\pi C_{pzt} V_s} \quad (3)$$

where $I_s$ is the output current of the amplifier (12) flowing through the actuator (10) and $C_{pzt}$ is the capacitance value of the actuator.

Thus, the frequency 'f' depends on the current $I_s$ and on the output voltage $V_s$. In general, the output current is limited to a value (denoted by $I_{lim}$) that sets the value of the maximum frequency.

This type of control has the drawback of quite a high level of hysteresis, and is not suitable for controlling systems requiring micropositioning, such as the very precise displacements of mirrors in the field of optics, for example.

Figure 2:
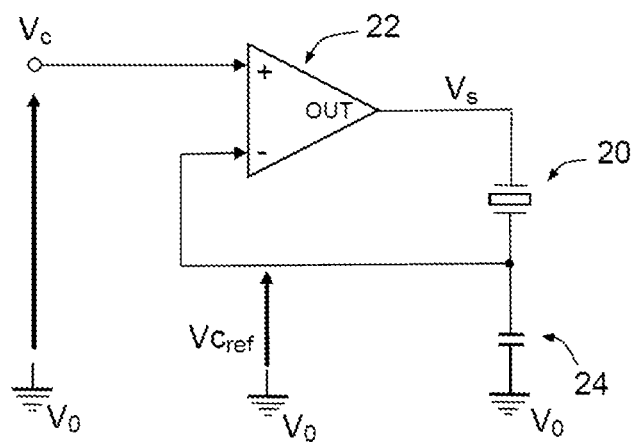
FIG. 2 illustrates a charge control device of the prior art.

FIG. 2 illustrates a charge control device known from the prior art. The principle of charge control consists in applying a constant quantity of charge to the electrodes of a piezoelectric actuator in order to obtain a linear behavior between control and the displacement brought about.

The circuit of FIG. 2 comprises a piezoelectric actuator (20) that is connected between the output 'OUT' and the inverting input (−) of an operational amplifier (22), the assembly being configured in a non-inverting setup. An input voltage $V_c$ is applied to the second, non-inverting input (+) of the amplifier. A capacitor, referred to as the reference capacitor (24), is connected in series with the piezoelectric actuator (20) to the inverting input. It has a voltage $Vc_{ref}$ across its terminals. The capacitor of capacitance $C_{ref}$ receives a quantity of charge $Q_{ref}$ that is proportional to the voltage across its terminals.

In a charge control circuit, the deformation of the piezoelectric actuator is linear according to the electric charge. Those skilled in the art may refer to the work by J. Agnus, "Etude, Realisation, Caractérisation et Commande d'une Micropince Piézoèlectrique" ("Study, Production, Characterization and Control of a Piezoelectric Microgripper"), University of Franche-Comté, 2003, which describes this relationship in greater detail and shows that the application of a constant quantity of charge to the electrodes of a piezoelectric actuator allows a linear behavior to be obtained between control and the displacement brought about.

Although this type of circuit allows the hysteresis to be decreased substantially, typically by a factor of 10, J. Agnus has demonstrated, in the aforementioned article, that this setup does not allow the initially applied charge to be maintained over the long term, and hence does not allow a constant linear deformation of the piezoelectric actuator to be maintained. It does not allow creep to be prevented.

In the steady or continuous state, the operational amplifier is saturated. Specifically, since the frequency of the control signals is zero, and the impedance of the capacitors is infinite, the latter then behave as open circuits. Under these conditions, the capacitor $C_{ref}$ (24) and the actuator (20) are in open circuit and the setup behaves like a voltage comparator, leading to the saturation of the operational amplifier.

In the dynamic state, the frequency of the output signal at the terminals of the actuator (20) depends solely on the value of the output current and of the input voltage $V_c$ of the amplifier.

With reference to FIG. 2, the piezoelectric actuator (20) may be replaced by an equivalent circuit, which is a capacitor '$C_{pzt}$' having an impedance $Z_P(p)=1/p$. $C_{pzt}$ Furthermore, by considering '$Z_R(p)$' to be the impedance of the reference capacitor (24) $C_{ref}$, and since the operational amplifier (22) operates linearly and the impedances $Z_R(p)$ and $Z_P(p)$ are in series, they then form a voltage divider. The expression for the input voltage $V_c(p)$ is given by the relationship:

$$V_e(p) = V_s(p) \frac{Z_R(p)}{Z_R(p) + Z_P(p)} \quad (4)$$

The resulting transfer function F(p) is:

$$F(p) = \frac{V_s(p)}{V_e(p)} = \frac{Z_R(p) + Z_P(p)}{Z_R(p)} \quad (5)$$

By replacing $Z_R(p)$ and $Z_P(p)$ by their respective expression, the following is obtained:

$$F(p) = \frac{\frac{1}{pC_{ref}} + \frac{1}{pC_{pzt}}}{\frac{1}{pC_{ref}}} \quad (6)$$

After simplifying this yields:

$$F(p) = \frac{C_{ref} + C_{pzt}}{C_{pzt}} \quad (7)$$

The voltage at the terminals of the actuator (20) is then:

$$V_{pzt}(p) = V_s(p) - V_e(p) = V_e(p) \frac{C_{ref}}{C_{pzt}} \quad (8)$$

Thus, in the dynamic state, the charge gain of the amplifier therefore depends only on the intrinsic capacitance value of the piezoelectric actuator and of the capacitor in series with the latter. By considering the capacitance of the reference capacitor to be fixed, that of the actuator varies according to certain parameters, including the voltage at its terminals. The expression for the operating frequency of the amplifier is then given by the equation:

$$f = \frac{i_s}{2\pi V_e C_{ref}} \quad (9)$$

Those skilled in the art observe that the frequency of the output signal, hence at the terminals of the piezoelectric actuator, depends solely on the value of the output current $i_s$ and of the input voltage $V_e$ of the amplifier.

Thus, this type of charge control circuit has the drawback of exhibiting a creep effect and of not allowing continuous control.

Figure 3:
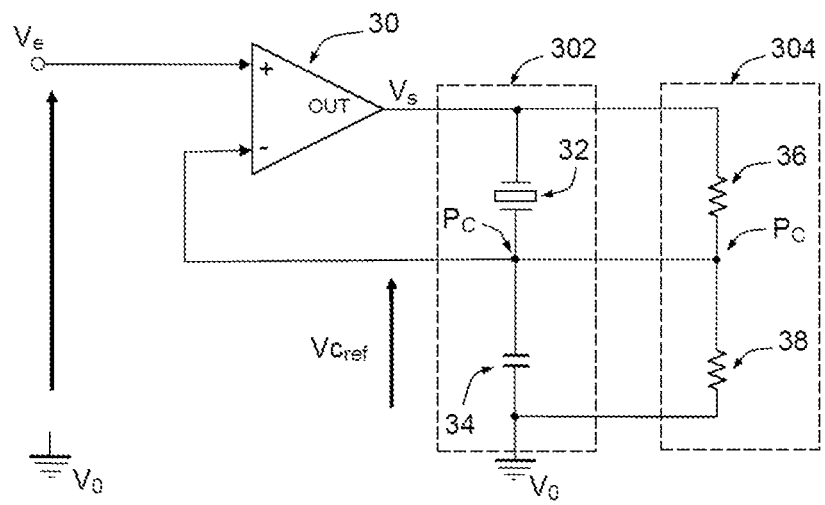
FIG. 3 illustrates a hybrid control device according to one embodiment of the invention.

FIG. 3 illustrates a hybrid control device according to one embodiment of the invention, combining both charge and voltage control modes.

The device (300) combines a first circuit (302) for controlling the charge control mode with a second circuit (304) for controlling the voltage control mode, the two circuits being coupled to an operational amplifier (30).

Advantageously, the hybrid setup of the invention makes it possible to switch between both charge and voltage modes automatically.

The amplifier (30) receives an input voltage $V_e$ on a first, non-inverting (+) input and delivers, as output 'OUT', an output voltage $V_s$.

The first circuit (302) comprises a piezoelectric actuator (32) and a capacitor (34) in series. The piezoelectric actuator (32) is connected to the output 'OUT' and to the inverting input of the operational amplifier (30). The capacitor (34) in series is connected to the inverting input of the operational amplifier and to a low voltage $V_0$.

The first circuit is a capacitive circuit comprising a piezoelectric actuator and a capacitor in series, said capacitive circuit being connected by the free end of the piezoelectric actuator to the output of the operational amplifier and by the free end of the capacitor to a low-voltage terminal.

The second circuit (304) comprises discrete components in series, and is composed of a first resistor (36) and of a second resistor (38) in series. The first resistor (36) is connected to the output 'OUT' and to the inverting input of the operational amplifier (30). The second resistor (38) is connected to the inverting input of the operational amplifier and to a low voltage $V_0$.

The second circuit is a resistive circuit comprising a first resistor and a second resistor in series, said resistive circuit being connected by the free end of the first resistor to the output of the operational amplifier and by the second resistor to a low-voltage terminal.

The low voltage may, preferably, be brought to ground.

The inverting output (−) of the amplifier (30) corresponds to a common connection point '$P_c$' between the two, capacitive (302) and resistive (304), circuits. The common connection point $P_c$ is shared between the actuator (32) and the capacitor (34), respectively, for the first circuit (302), and between the first resistor (36) and the second resistor (38), respectively, for the second circuit (304). The common connection point '$P_c$' has a voltage denoted by '$V_{Cref}$'.

Thus, the device is characterized in that the inverting input of the operational amplifier is both connected to the common ends of the piezoelectric actuator and of the capacitor, and is connected to the common ends between the first and the second resistor, the capacitive circuit and the resistive circuit forming an impedance bridge.

The device of the invention therefore provides an impedance bridge formed by the capacitors (32, 34) of the first circuit (302) and by the first and second resistors (36, 38) of the second circuit (304).

Equilibrium of this bridge is achieved when:

$$\frac{C_{pzt}}{C_{ref}} = \frac{R_{ref}}{R_{pzt}} \quad (10)$$

where $C_{pzt}$ represents the intrinsic capacitance of the piezoelectric actuator (32);

$C_{ref}$ represents the capacitance of the capacitor (34);

$R_{pzt}$ and $R_{ref}$ represent the first and second resistances, respectively, of the second circuit (304).

Advantageously, the values of the resistances of the resistive bridge (304) are defined so as to compensate for several effects:

a choice of high resistance values leads to a decrease in the bandwidth of the setup, and vice versa;

on choosing low resistance values, the frequency of the control signal must be high in order to allow charge control;

a choice of high values for the resistances $R_{pzt}$ and $R_{ref}$, of the order of MS) to GS), has the drawback that the discrete resistances have the same order of magnitude as the values of the leakage resistances of the capacitors, which does not allow the level of optimization given by the equation $$\frac{R_{pzt}}{R_{ref}} = \frac{C_{ref}}{C_{pzt}}$$

to be reached and does not allow a hybrid control that decreases the hysteresis of the actuators to be obtained.

In the Laplace domain, the output voltage $V_s(p)$ of the amplifier and the voltage at the terminals of the piezoelectric actuator $V_{pzt}(p)$ are expressed by the following equations (11) and (12), respectively:

$$Vs(p) = \frac{Rc_{ref} + R_{pzt}}{Rc_{ref}} * \frac{1 + \frac{Rc_{ref} * R_{pzt}}{Rc_{ref} + R_{pzt}}(Cc_{ref} + C_{pzt})p}{1 + R_{pzt} * C_{pzt}} * V_e(p) \quad (11)$$

$$V_{pzt}(p) = V_s(p) - V_e(p) = \frac{\frac{R_{pzt}}{Rc_{ref}} + (R_{pzt} * Cc_{ref})p}{1 + (R_{pzt} * C_{pzt})p} \quad (12)$$

where the parameters represent:
'p' is the Laplace variable;
'Cpzt' is the intrinsic capacitance of the piezoelectric actuator;
'Rpzt' is the resistance in parallel with the actuator;
'CCref' is the capacitance of the reference capacitor;
'RCref' is the resistance in parallel with the reference capacitor.

The value of the chopping frequency of the device of FIG. 3 may be determined according to the maximum output current $i_{smax}$ delivered by the operational amplifier, the amplitude $A_e$ of the input voltage Ve(t), which is considered to be sinusoidal, and the value of the capacitance of the reference capacitor $C_{ref}$, according to the following equation:

$$f = \frac{i_{smax}}{2 * \pi * Ae * Cc_{ref}} \quad (13)$$

In considering equation (12), those skilled in the art observe that, for a given input voltage, when 'p' tends toward 0, the gain of the transfer function tends toward '$R_{pzt}/R_{Cref}$', and, when 'p' tends toward infinity, the gain of the transfer function tends toward '$Cc_{ref}/C_{pzt}$'.

From a physical standpoint, when the frequency tends toward 0, the capacitors $C_{pzt}$ (32) and $C_{ref}$ (34) are equivalent to open circuits. The output current flows solely through the resistors $R_{pzt}$ (36) and '$Rc_{ref}$' (38). In this mode, the device behaves like a voltage control circuit.

When the frequency tends toward infinity, the capacitors $C_{pzt}$ (32) and $C_{ref}$ (34) are equivalent to short circuits. All of the output current flows through these two capacitors. In this mode, the device behaves like a charge control circuit.

Advantageously, at extreme low and high frequencies, there is no phase shift between the input and output signals. The low-frequency gain is set by the resistors (36, 38) while, at high frequencies, it is set by the capacitors (32, 34).

The output current '$i_s$' is given by the following equation:

$$i_s(t) = i_{sR}(t) + i_{sC}(t) = \left(Cc_{ref} * \frac{d}{dt}[V_e(t)]\right) + \left(\frac{V_e(t)}{Rc_{ref}}\right) \quad (14)$$

The time constant of the setup is:

$$\tau = R_{pzt} * C_{pzt} \quad (15)$$

For switching between the charge and voltage control modes to take place automatically, the voltage gains at high and low frequency must be equal.

When this condition of equality of voltage gains is met, the behavior of the device of the invention is as follows:

After the application of a control signal at a given frequency, the piezoelectric actuator is displaced to a certain position, with decreased hysteresis. It is the charge control mode with the capacitive portion of the first circuit (302), composed of $C_{ref}$ and $C_{pzt}$, that is brought into play.

Next, in the steady state, with the application of a continuous signal, the resistive portion of the second circuit (304), composed of $R_{pzt}$ and $R_{ref}$, comes into operation. This is the voltage control mode.

Since the voltage and charge control gains are identical, the voltage at the terminals of the piezoelectric actuator (32) is constant.

Thus, advantageously, the actuator is no longer displaced, the displacement being held stable. There is therefore no longer any creep, unlike the known charge control devices.

The control of piezoelectric actuators for Fabry-Pérot interferometers must observe precise positioning requirements. Specifically, these piezoelectric actuators must ensure the displacement and alignment of the flats of the interferometer for a travel of 0-200 µm with a positioning accuracy of the order of a nanometer, a very high degree of reproducibility of positioning (very low hysteresis) and a linearity error, along with very low drift (very low creep). The device of the present invention allows these requirements to be met.

Figure 4:
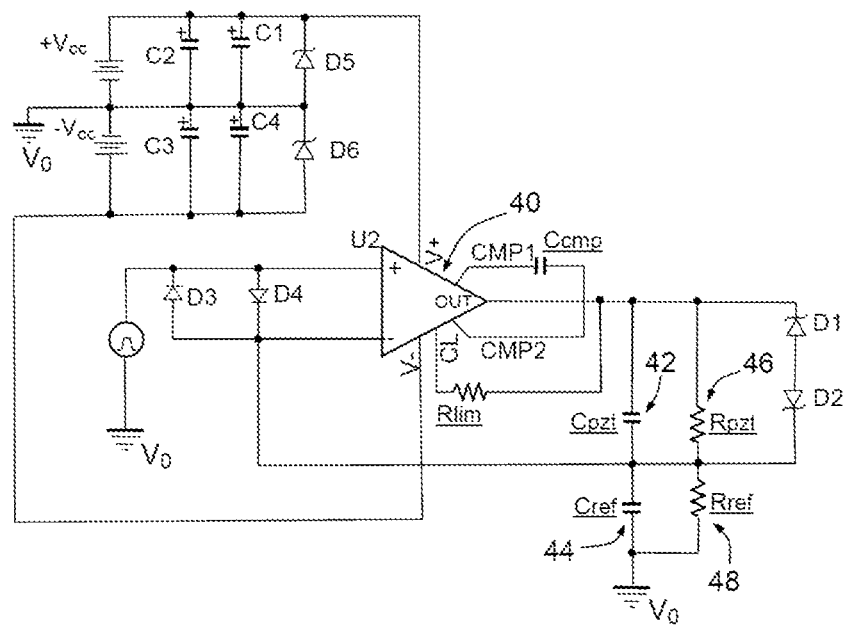
FIG. 4 illustrates an exemplary implementation of the device of the invention.

FIG. 4 illustrates an exemplary implementation of the device of the invention when applied to the control of movable mirrors in Fabry-Pérot interferometers.

The hybrid control device such as detailed in FIG. 3 is shown in FIG. 4 with the references (40) for the operational amplifier, (42) for the piezoelectric actuator $C_{pzt}$, (44) for the reference capacitor $C_{ref}$ and (46) and (48) for the first and second resistors, respectively.

Various electronic components, applied conventionally for those skilled in the art, are added around the device of the invention in order to allow the desired operating behavior. Thus, in a non-limiting manner, capacitors (C1, C2, C3, C4) may be added in order to allow the supply voltages (+$V_{cc}$, −$V_{cc}$) to be decoupled, and unidirectional transil diodes (D1, D2) for limiting the voltage at the terminals of the piezoelectric actuator (42). A resistor $R_{lim}$ may be added in order to limit the current drawn by the actuator, along with a phase compensation capacitor $C_{cmp}$. Diodes (D3, D4) for protecting the differential input of the amplifier (40) may be added, along with transil diodes (D5, D6) for protecting the setup from overvoltages and polarity reversals of the supply voltages.

In one preferred implementation, the amplifier may be a high-voltage amplifier supplied with between −60 V and +160 V, the voltage at the terminals of the actuator may be limited to +150 V and −20 V, respectively, and the current drawn by the actuator may be limited to 130 mA.

The table below shows the results of comparing the hysteresis curves obtained with an operational amplifier of gain 20 controlling multiple piezoelectric actuators by conventional voltage control and by hybrid control according to the device of the present invention.

The piezoelectric actuators used have the following properties:

| Parameter | Value | Unit |
|---|---|---|
| Supply voltage ($V_{pzt}$) | −20 to +150 | V |
| Max. displacement without load ($\Delta D_{pzt}$) | 344 | μm |
| Intrinsic capacitance $C_{pzt}$ | 10 | μF |
| Free-free resonant frequency ($Fr_{pzt}$) | 2738 | Hz |
| Free-blocked resonant frequency ($Fr_{pzt}$) | 634 | Hz |
| Free-free response time ($tr_{pzt}$) | 0.18 | ms |
| Free-blocked response time ($tr_{pzt}$) | 0.79 | ms |
| Resolution | 3.44 | nm |
| Mass ($M_{pzt}$) | 47.5 | g |
| Stiffness ($K_{pzt}$) | 0.55 | N/μm |
| Blocking force | 189 | N |
| Temperature variation index ($k_t$) | 3.38 | μm/° K |
| Hysteresis (H) | 16 < H < 20 | % |
| Drift factor | Not specified | |

The comparison in the table below is given for measurements taken on three piezoelectric actuators.

| Actuator | Voltage control hysteresis | Hybrid amplifier hysteresis | Decrease factor |
|---|---|---|---|
| 1 | 19.01% | 0.76% | 96.00% |
| 2 | 19.42% | 0.85% | 95.62% |
| 3 | 16.82% | 0.23% | 98.63% |

In the last column, a substantial decrease in the hysteresis regardless of the actuator may be observed. Specifically, the voltage controls ($2^{nd}$ column) result in a hysteresis of the order of 20% of the total amplitude of displacement of the piezoelectric actuators while for the hybrid amplifier (3rd column) this same hysteresis is decreased to about 1%.

Figure 5:
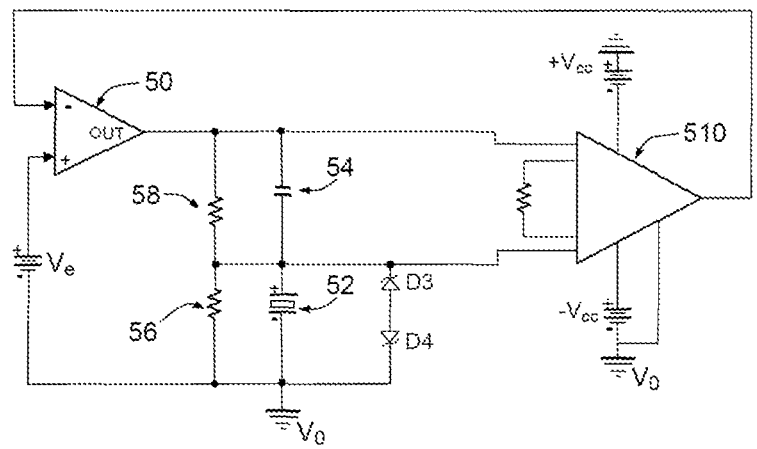
FIG. 5 illustrates one variant implementation of the device of the invention.

FIG. 5 illustrates one variant implementation of the device of the invention in the context of unipolar control.

The hybrid control device such as detailed in FIG. 3 is shown in FIG. 5 with the references (50) for the operational amplifier, (52) for the piezoelectric actuator $C_{pzt}$, (54) for the reference capacitor $C_{ref}$ and (56) and (58) for the first and second resistors, respectively. In this setup, one terminal of the actuator (52) is linked to ground, the other terminal participating in the midpoint of the impedance bridge.

Various electronic components, applied conventionally for those skilled in the art, are added around the device of the invention in order to allow the desired operating behavior. Thus, in a non-limiting manner, unidirectional transil diodes (D3, D4) may be added in order to limit the voltage at the terminals of the piezoelectric actuator (52).

In the setup of FIG. 5, an instrumentation amplifier (510) is added, for the purpose of equalizing the reference voltage and the voltage across the terminals of the set ($R_{ref}$, $C_{ref}$). One input of the instrumentation amplifier receives the output of the operational amplifier, the other input of the instrumentation amplifier being connected to the midpoint of the impedance bridge. The output of the instrumentation amplifier is looped back to the inverting input of the operational amplifier.

By stating $$R_{pzt} * C_{pzt} = R_{ref} * C_{ref},$$

i.e. $\dfrac{R_{pzt}}{R_{ref}} = \dfrac{C_{ref}}{C_{pzt}},$ this setup makes it possible to produce an ideal low-frequency charge amplifier.

Since the operation of the hybrid amplifier is the combination of two (voltage and charge) control modes, it is important to identify the frequency range within which each operating mode is dominant. This frequency range is characterized by the center frequency defined by the equation:

$$f_c = \frac{1}{2\pi R_{pzt} C_{pzt}}.$$

For frequencies higher than $f_c$, it is then the charge control mode that is brought into play and, for frequencies lower than $f_c$, it is the voltage control mode that dominates.

Such a setup is particularly suitable for the unipolar control of piezoelectric actuators, the control of which does not require high voltages, of the order of 10 V.

Figure 6:
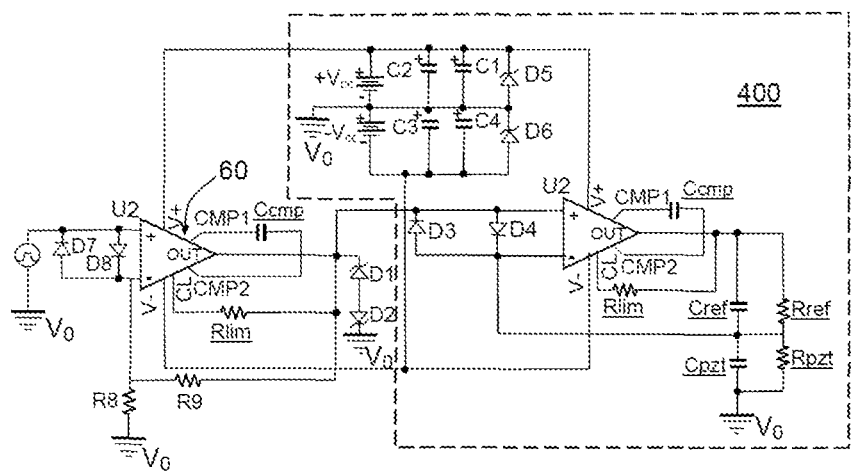
FIG. 6 illustrates another variant implementation of the device of the invention.

FIG. 6 illustrates one variant implementation of the device of the invention in the context of unipolar control for the cases in which the control voltage is high, such as in the case of large displacements. For the sake of simplicity, the set of components of the variant of FIG. 4 is referenced solely by (400) and they are not described again. In this variant, a non-inverting amplifier (60) is added upstream of the hybrid amplifier.

In this setup, the first amplifier (60) is used to amplify the control signal Vin. The gain of this amplifier is then given by the relationship:

$$A_v = 1 + \frac{R_9}{R_8}.$$

The second portion of the setup consists of the hybrid amplifier (400) having one of the terminals of the actuator connected to ground.

In such a setup, the equation $$\frac{R_{pzt}}{R_{ref}} = \frac{C_{ref}}{C_{pzt}}$$

is conserved, making it possible to obtain the same decrease in hysteresis as in the setup of FIG. 4. Advantageous applications of this setup are adaptive optics applications for the open-loop control of deformable mirrors.

The present description thus illustrates various non-limiting implementations of the invention. The examples have been chosen so as to allow a good understanding of the principles of the invention, but these are in no way exhaustive, and should allow those skilled in the art to provide modifications and implementation variants while keeping the same principles.

It has been shown that the hybrid amplifier of the invention allows the amplitude of the hysteresis of the piezoelectric actuators to be significantly decreased. The proposed device thus makes it possible to linearize the displacement of an actuator according to the voltage applied to its terminals or to the setpoint voltage.

Another advantage of the device of the invention is that it does not require a hysteresis model (Preisach, Maxwell, etc.) and may consequently operate with any piezoelectric actuator, within the limits of the electronic setup. The only parameters that must be known for the implementation thereof are the intrinsic capacitance of the piezoelectric actuator at rest and its bandwidth, such data generally being available in the catalogs of piezoelectric actuator manufacturers.

The fields of application of the hybrid amplifier of the invention could be, for example, nano- and micropositioning, mechatronics applications or even the field of virtual reality.

The invention claimed is:

1. A device for controlling a piezoelectric actuator comprising:
    an operational amplifier having an inverting input and a non-inverting input, and an output allowing an output voltage to be delivered;
    a capacitive circuit comprising a piezoelectric actuator and a capacitor in series, said capacitive circuit being connected by the free end of the piezoelectric actuator to the output of the operational amplifier and by the free end of the capacitor to a low-voltage terminal;
    a resistive circuit comprising a first resistor and a second resistor in series, said resistive circuit being connected by the free end of the first resistor to the output of the operational amplifier and by the second resistor to a low-voltage terminal;
    the device wherein the inverting input of the operational amplifier is connected to the common ends of the piezoelectric actuator and of the capacitor, and is connected to the common ends of the first and the second resistor, the capacitive circuit and the resistive circuit forming an impedance bridge; and
    unidirectional transil diodes that are connected to the terminals of the piezoelectric actuator in order to limit the voltage at said terminals.

2. The device as claimed in claim 1, wherein the ratio of the impedances of the capacitive circuit is equal to the ratio of the impedances of the resistive circuit.

3. The device as claimed in claim 1, wherein a control signal at a given frequency applied to the non-inverting input of the operational amplifier allows the piezoelectric actuator to be charge-controlled.

4. The device as claimed in claim 1, wherein a continuous control signal applied to the non-inverting input of the operational amplifier allows the piezoelectric actuator to be voltage-controlled.

5. The device as claimed in claim 1, wherein the operational amplifier is supplied with between 60 V and +160 V.

6. The device as claimed in claim 1, wherein the voltage at the terminals of the piezoelectric actuator is limited to +150 V and −20 V, respectively.

7. The device as claimed in claim 6, further comprising a resistor that is connected to the output of the operational amplifier in order to limit the current drawn by the piezoelectric actuator.

8. A Fabry-Perot interferometer controlled by a device as claimed in claim 1.

* * * * *